219-121 SR

2/27/79 OR 4,142,089

United States Patent [19]

Lau et al.

[11] 4,142,089

[45] Feb. 27, 1979

[54] PULSED COAXIAL THERMAL PLASMA SPRAYER

[75] Inventors: John H. W. Lau; C. James Margerum, both of Ottawa, Canada

[73] Assignee: Canadian Patents and Development Limited, Ottowa, Canada

[21] Appl. No.: 780,061

[22] Filed: Mar. 22, 1977

[51] Int. Cl.[2] .......... B23K 9/06

[52] U.S. Cl. .......... 219/121 P; 219/75; 219/76.16; 427/34

[58] Field of Search .......... 219/121 P, 76, 75, 121 R; 427/34, 37; 118/302; 313/231.3

[56] References Cited

U.S. PATENT DOCUMENTS

| | | | |
|---|---|---|---|
| 3,010,009 | 11/1961 | Ducati | 427/34 X |
| 3,212,914 | 10/1965 | Lyle et al. | 427/37 |
| 3,602,683 | 8/1971 | Hishidu et al. | 219/121 P |
| 3,606,667 | 9/1971 | Kreider | 427/34 |
| 3,628,079 | 12/1971 | Dobbs et al. | 219/121 P X |
| 3,803,380 | 4/1974 | Raguller | 219/121 P |
| 3,819,840 | 6/1974 | Schultz | 219/121 P |
| 3,832,513 | 8/1974 | Klasson | 219/121 P |
| 3,988,566 | 10/1976 | Vogts et al. | 219/121 P |

FOREIGN PATENT DOCUMENTS

| | | | |
|---|---|---|---|
| 2158547 | 6/1973 | France | 219/121 P |
| 4637081 | 9/1968 | Japan | 427/34 |
| 1030937 | 12/1966 | United Kingdom | 427/34 |

OTHER PUBLICATIONS

"Blam" from "Canadian Paint and Finishing" 10-1969.
"Plasma Arc Weld" Surfacing 6/1962 Welding Journal by Zuchowski et al.

*Primary Examiner*—J. V. Truhe
*Assistant Examiner*—M. Paschell
*Attorney, Agent, or Firm*—Edward Rymek

[57] ABSTRACT

Apparatus for thermal spraying powdered material onto a substrate. The apparatus consists of an elongated conductive tube, an electrode positioned coaxially within one end of the tube. Inert gas such as helium is mixed with a powdered material such as a ceramic or a metal and a controlled amount is injected evenly into the tube. A high energy pulse is applied between the electrode and the conductive tube to produce current sheets which move from one end of the electrode to the other forming a high temperature and velocity plasma for melting and discharging the powdered material at a high velocity from the other end of the tube.

5 Claims, 2 Drawing Figures

PULSED COAXIAL THERMAL PLASMA SPRAYER

BACKGROUND OF THE INVENTION

This invention is directed to apparatus for the application of a coating to an object by thermal spraying and in particular to an apparatus which heats and propels powder particles by a high current, transient discharge plasma arc.

Of the several thermal processes, the detonation gun produces the highest quality coating. This type of apparatus is described in the publication by T. C. McGeary and J. M. Koffshey entitled "Engineering Applications for Flame Plating" — Metal Progress, Jan. 1965. This process is essentially a modification of the steady combustion spraying process in that chemical energy is released periodically in the form of detonation waves. The pressure, temperature and velocity of the detonation product are substantially higher than in the steady process, resulting in higher velocity powder particles and thus a better quality and more adherent coating. However, it has been found that this process is very noisy and can result in oxidized coating.

A process which avoids this problem, is the steady plasma arc process, examples of which are described in U.S. Pat. No. 3,246,114 issued Apr. 12, 1966 to Matvay and U.S. Pat. No. 3,346,698 issued Oct. 17, 1967 to Ingham Jr. These devices use a steady plasma flame as the heat source in the spraying process to heat and propel the powder particles. However, it has been found that the temperature and pressures cannot be raised to high levels since the plasma confining walls tend towards a thermal equilibrium with the plasma resulting in heat loss and the electrodes have a tendency to erode.

These disadvantages may be overcome by apparatus in which a pulsed mode of arc heating is utilized since higher temperatures and velocities may be achieved. One such apparatus is described in U.S. Pat. No. 3,212,914 issued to Lyle et al. on Oct. 19, 1965 which provides for a high temperature, high velocity coating process that employs a pulsed electric discharge in an inert gas atmosphere as the coating energy source. However, to date, apparatus that has found acceptance over the detonation gun described above, has not been developed.

SUMMARY OF THE INVENTION

It is therefore an object of this invention to provide an improved thermal spraying apparatus for producing coatings on a substrate in an inert gas environment thereby permitting the use of metallic or non-metallic powders.

It is a further object of this invention to provide a thermal spraying apparatus capable of discharging molten powdered material at greater velocities.

It is another object of this invention to provide a thermal spraying apparatus which is not subject to continuous high temperatures.

These and other objects are achieved in a pulsed plasma spraying apparatus which consists of an elongated electrically conductive tube, an elongated centre electrode mounted coaxially within a first end of the tube, an injector for injecting an inert gas-powdered material mixture into the first end of the tube, and a power supply for applying a high energy pulse between the centre electrode and the tube to produce current sheets moving along the length of the centre electrode thereby forming a high temperature and velocity plasma which melts and discharges the powdered material at a high velocity from the second end of the tube.

The centre electrode may have an enlarged diameter at its first end to facilitate the initiation of the discharge, and the tube may include a reduced diameter extension at its second end to increase the velocity and to provide uniform spraying. The spraying apparatus may further include a valve to control the quantity of mixture entering the tube and a control to synchronize the pulse with the mixture valve.

DESCRIPTION OF THE PREFERRED EMBODIMENTS

Figure 1:
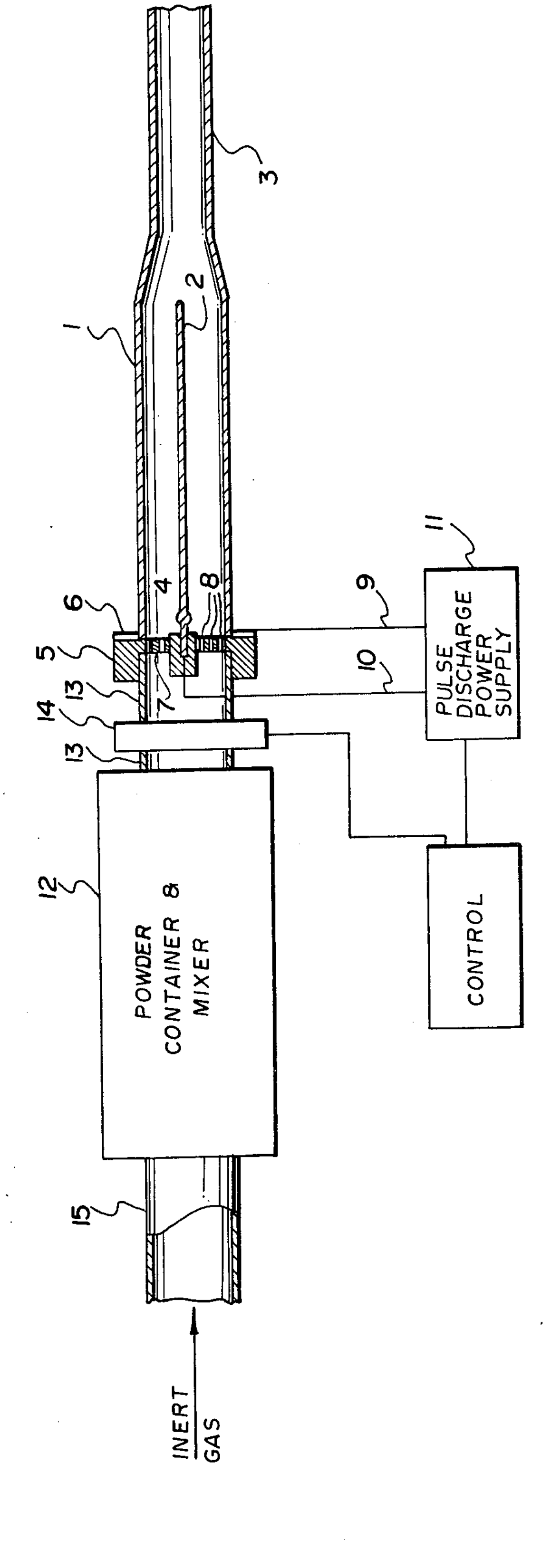
FIG. 1 illustrates the spraying apparatus.

The pulsed coaxial plasma gun sprayer illustrated in FIG. 1 consists of a conductive cylindrical discharge tube 1 with a coaxially positioned electrode 2. These may be made of copper or other conductive material. The end 3 of tube 1 may be reduced in order to provide a uniform spray. Tube 1 may have an inside diameter in the order of 1.5 cm or smaller with the end 3 having an inside diameter of 1 cm or less. Electrode 2 may have a diameter in the order of 3 mm. The electrode 2 is generally of constant diameter, though it may have a slightly enlarged diameter at one end 4 which facilitates the initiation of the arc between the centre electrode 2 and tube 1. To maintain the electrode 2 rigid within the tube 1, electrode 2 is mounted within a molded insulating material 5 to which the tubing 1 may be fastened by a flange 6. The insulating material 5 further includes an annulus 7 between the electrode 2 and tube 1, which has a spaced array of perforations or holes 8 by which powder laden inert gas is admitted into the discharge tube. The tube 1 and electrode 2 are connected to leads 9 and 10 respectively by which they may be connected to a pulse discharge power supply 11. Finally the sprayer includes a container 12 in which conventional ceramic or metallic coating powder, such as aluminum oxide or tungsten carbide, is stored, mixed with an inert gas and periodically injected into the discharge tube via a conduit 13 and a valve 14.

Inert gas such as helium, argon or nitrogen may be used, however helium is preferred since helium breaks down easily with high voltage pulses, it has a high thermal conductivity and can be accelerated to high velocities because of its low density.

In operation, inert gas which flows through conduit 15 is mixed with the powder in container 12 and is injected into the discharge tube through holes 8 under the control of valve 14. A high energy pulse is applied to the electrode 2 from the supply 10 which may consist of a bank of high voltage capacitors. The inert gas in the discharge tube 1 breaks down and a current sheet between electrode 2 and tube 1 is initiated at the slightly enlarged diameter 4, with each half cycle. Care must be taken to control the amount of powder and to time its injection with the high energy pulse. A control circuit 16 may be used to control the amount of gas-powder mixture injected into tube 1 and to synchronize the firing of supply 11. If the amount of powder is too great or if the spraying apparatus is pulsed too late, the coating formed on the target may include non-molten particles resulting in a poor quality coating. This problem may also be partially alleviated by continuously flushing the target to remove any particles prior to the actual discharge.

Figure 2:
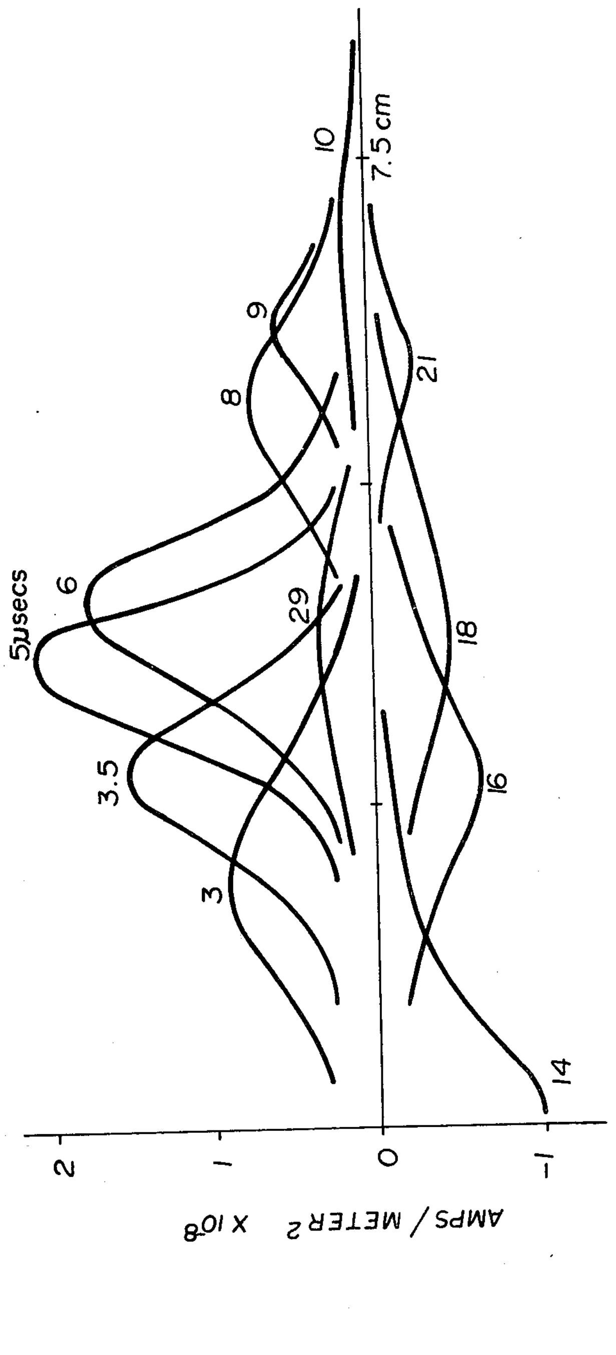
FIG. 2 illustrates the current sheet propagation within the apparatus.

In a pulse discharge sprayer having a discharge tube 1 approximately 8 cm long, a 1.4 cm inside diameter and a reduced diameter extension section 3 approximately 5 cm long, and a centre electrode approximately 7.5 cm long and a 3 mm diameter, a 6 kV pulse produced the current sheet propagation illustrated in FIG. 2. During each half cycle, of which three are shown, the current sheet is initiated at the back end 4 of the electrode 2 and is forced to move quickly down the electrode by the magnetic field generated and by the heated plasma expansion. As can be seen from FIG. 2, the current density during the first half cycle rises to approximately 2 amps/$10^{-8}$ meters$^2$ in approximately 5 $\mu$secs and at the same time moves approximately 4 cm down the discharge tube 1. This results in an extremely high temperature, pressure and velocity plasma. The advancing current sheet heats and partially sweeps up the inert gas behind it. As the pressure increases, a shock wave forms and travels ahead of the current sheet. The temperature inside the discharge can be greater than 20,000° K. and the gas velocity can be greater than 3 KM/sec. thus assuring the melting of the powdered material and its discharge from the sprayer at great velocities. This mode of discharge produces a radially uniform plasma in contrast to the steady plasma arc jet in which steep radial temperature gradients exist.

Though specific dimensions have been stipulated with respect to the embodiments described above, the instrument size and power levels can be scaled downward, or upward by at least a factor of two. In addition, though conventional powders for low velocity devices can be used with the pulse discharge sprayer in accordance with the present invention, smaller size powders are desired due to the high intensity and short duration of the pulse discharge.

We claim:

1. Apparatus for applying a coating of material to a substrate comprising:

an elongated electrically conductive tube;

an elongated centre electrode mounted coaxially within a first end of said tube;

means for injecting a mixture of inert gas and powdered material into the first end of said tube; and means for applying a high energy pulse between the first end of said centre electrode and the first end of of said tube to produce successive current sheets which are initiated between said centre electrode and said conductive tube at the first end of said centre electrode and said tube and which move between said centre electrode and said conductive tube towards the second end of said centre electrode and said tube thereby forming a high temperature and velocity plasma for melting and discharging the powdered material at a high velocity from the second end of said tube.

2. Apparatus as claimed in claim 1 wherein the conductive tube includes a reduced diameter extension section located at the second end of said tube.

3. Apparatus as claimed in claim 1 which further includes an insulating annular disc positioned between the centre electrode and the tube at the first end of said tube, said annular disc having spaced perforations for distributing the inert gas-powdered material mixture evenly as the mixture enters the conductive tube.

4. Apparatus as claimed in claim 1 wherein said injecting means including means for mixing the inert gas and the powdered material and controlled valve means positioned between the mixing means and the tube to control the quantity of mixture entering the conductive tube.

5. Apparatus as claimed in claim 4 which further includes switching means for opening and closing said valve means and for synchronizing the pulse applying means to said valve means.

* * * * *

UNITED STATES PATENT AND TRADEMARK OFFICE

CERTIFICATE OF CORRECTION

PATENT NO. : 4,142,089

DATED : February 27, 1979

INVENTOR(S) : John H.W. Lau, C. James Margerum

It is certified that error appears in the above-identified patent and that said Letters Patent are hereby corrected as shown below:

In column 4, line 6, after "said tube" insert - , the centre electrode having an enlarged diameter at the first end to facilitate the initiation of an arc discharge between the electrode and the tube - .

Signed and Sealed this

*Twenty-ninth* Day of *May 1979*

[SEAL]

*Attest:*

RUTH C. MASON
*Attesting Officer*

DONALD W. BANNER
*Commissioner of Patents and Trademarks*